UNITED STATES PATENT OFFICE.

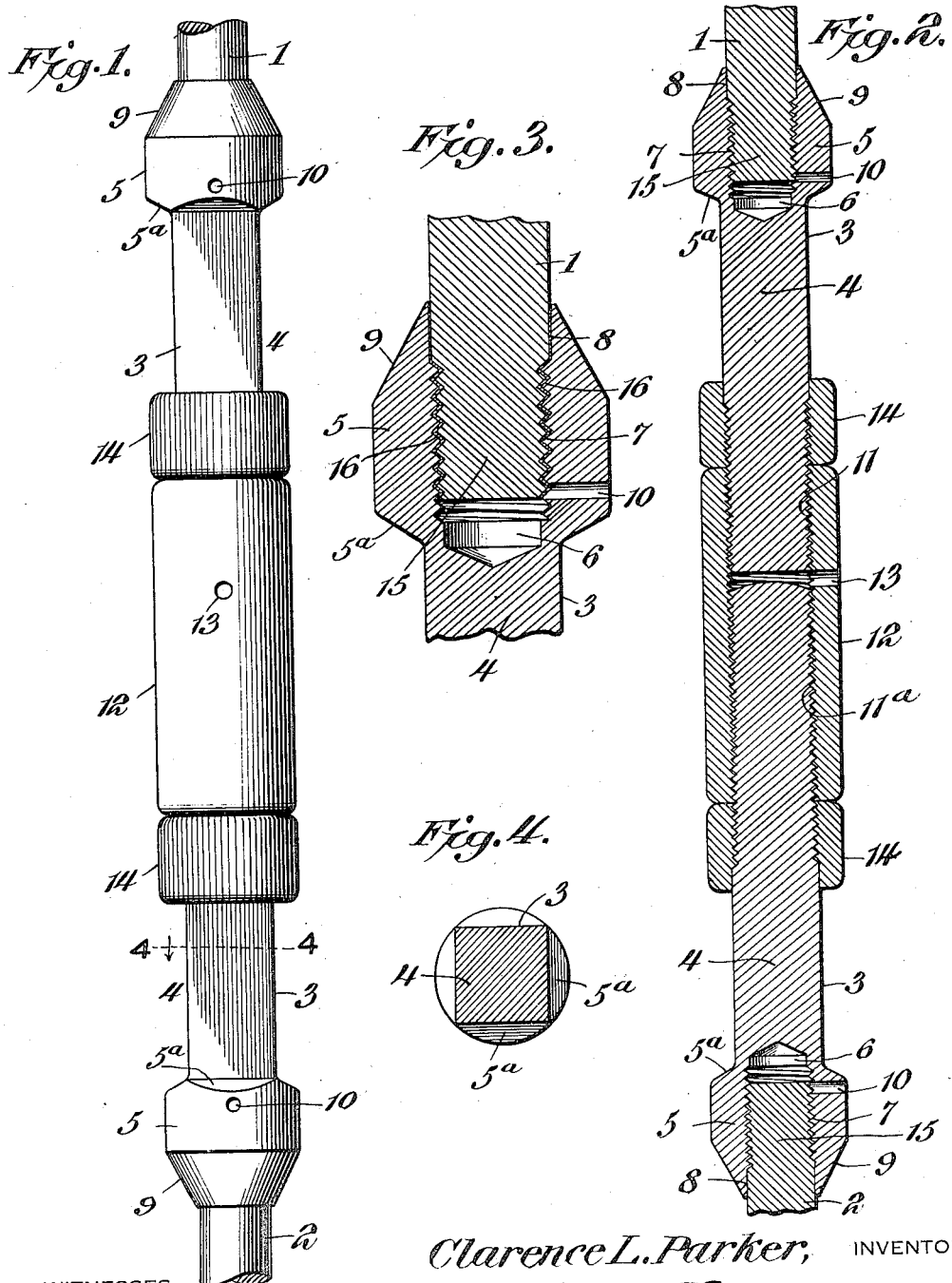

CLARENCE LYMAN PARKER, OF LOS ANGELES, CALIFORNIA.

SUCKER-ROD COUPLING.

1,064,764.

Specification of Letters Patent.

Patented June 17, 1913.

Application filed June 25, 1912. Serial No. 705,830.

*To all whom it may concern:*

Be it known that I, CLARENCE L. PARKER, a citizen of the United States, residing at Los Angeles, in the county of Los Angeles and State of California, have invented a new and useful Sucker-Rod Coupling, of which the following is a specification.

This invention has reference to improvements in sucker rod couplings designed more particularly for use in deep wells, and its object is to provide a coupling requiring a minimum of work to produce the coupling, and at the same time form a device particularly adapted for the use intended.

In order that the sucker rods may be conveniently handled they are made in comparatively short sections and are provided with couplings by means of which the sections may be joined in alinement to the combined length desired. Difficulty has been encountered in the breaking of the sucker rods at the couplings due to the weakening of the rod by the cutting of threads thereon, so that the expedient has been employed of enlarging or upsetting the ends of the rods and then threading them, wherefore the threaded ends at the bases of the threads are as thick as, or thicker than the main body of the rods. Furthermore, in order to provide means for the application of tools by which the rod sections may be screwed up tight or unscrewed from the junction member of the coupling, it has been proposed to further enlarge the threaded end of the rod adjacent the threads by the application of a sleeve shaped for the application of a suitable tool. These expedients mean considerable work and expense which it is the purpose of the present invention to avoid without, however, any sacrifice of the advantages due to the heretofore proposed arrangements. To this end the sucker rod section remains of the same diameter throughout except that the ends are threaded in the usual manner without any attempt to first enlarge these ends by upsetting them. There is provided a terminal member for each end of the rod of sufficiently larger diameter to permit the cutting of exterior threads on one end for entrance into the usual coupling sleeve, while the other end is suitably enlarged and formed with an axial socket interiorly threaded to receive the threaded end of the sucker rod, and this socket is counterbored at its entrance end for a suitable distance, while the threaded portion of the socket and the threaded end of the sucker rod are so related that the counterbored portion of the socket will receive a suitable length of the smooth unthreaded portion of the sucker rod adjacent the threads. To provide positive connection between the sucker rod and the threaded end extension thereof both the threaded end of the rod and the socket end of the extension are suitably heated and a cementing material, such as solder or spelter is applied, and while the cementing material is in the melted condition the parts are screwed together, wherefore when the parts have cooled sufficiently to allow the solidification of the cementing material there is a union defying any forces tending to separate the rod and end extension under conditions of use. Moreover, the socket portion extends sufficiently along the smooth portion of the sucker rod to reinforce this part of the sucker rod so that the weakening effect of the cutting of threads on the exterior of the sucker rod is completely neutralized. Moreover, the end extension of the sucker rod is tapered longitudinally where the socket is formed so as to present no corners liable to catch on the well casing, but all parts are so related that the sucker rod whether being raised or lowered will readily ride off from any projection which it may encounter, while the exterior of the end extension of the sucker rod is suitably shaped as by flattening or squaring to receive a turning wrench or other tool employed for screwing up or unscrewing the sucker rod sections.

The invention will be best understood from a consideration of the following detailed description taken in connection with the accompanying drawings forming a part of this specification with the further understanding that while the showing of the drawings is of a practical form of the invention, it is susceptible of other practical embodiments, wherefore the invention is not confined to any strict conformity with the showing of the drawings, but may be changed and modified so long as such changes do not mark any material departure from the salient features of the invention.

In the drawings:—Figure 1 is an elevation of a sucker rod coupling constructed in accordance with the present invention. Fig. 2 is a longitudinal diametric section of the structure shown in Fig. 1. Fig. 3 is an enlarged longitudinal diametric section of one end of a sucker rod and the socket end of the extension thereof showing the cementing material, the proportions being exaggerated for clearness of illustration. Fig. 4 is a section on the line 4—4 of Fig. 1.

Referring to the drawings, there are shown two sucker rod sections 1, 2, each provided with an end extension member 3 and as these end extension members may be substantially alike, a description of one will apply to both, and it may be further considered that the two extension members shown indicate the extension members on the opposite ends of a single rod section. Each extension 3 comprises a central portion 4 which may be squared as indicated in the drawings, particularly in Fig. 4, or may be of any suitable non-circular shape adapting it for the application of a turning wrench or other similar tool. One end of the extension member 3 is laterally expanded, as indicated at 5, the junction portion being beveled, as indicated at 5ª, to avoid any sharp corners. The free end of the expanded portion 5 is entered by an axial socket 6 for an appropriate distance, and the interior of this socket is screw-threaded, as indicated at 7, the screw threads terminating short of the free end of the socket to form a counterbored portion 8 of a diameter approximately that of the socket at the valleys of the screw threads. The expanded portion 5 tapers, as indicated at 9, toward the open end of the socket 6, so that there are no sharp shoulders present. Extending through one side of the expanded member 5 is a passage 10 open at one end to the atmosphere and at the other end opening into the socket 6.

The other end of the extension member 3, that is the end remote from the socket member 5, is screw threaded, as indicated at 11, this screw threaded portion being adapted to the corresponding portion of a straight coupling sleeve 12 formed at an appropriate point with a vent 13, and the threaded end 11 of the extension 3 is sufficiently extensive to not only enter the coupling sleeve 12 to an appropriate distance but to receive a lock nut 14 which may be made of harder material than the coupling sleeve and the other parts of the coupling so as to resist wear and thereby protect the coupling from the effects of engagement of the same with the inner walls of the well casing, or other parts with which the coupling may come into contact. The threaded ends 11 may vary somewhat in length at the opposite ends of the sucker rod section, and in Fig. 2 one of these ends, indicated at 11ª is shown as longer than the other indicated at 11, and the vent hole 13 is correspondingly located.

Each coupling rod 1 or 2, as the case may be, has its ends exteriorly threaded, such ends being indicated at 15. These rods may be of one diameter throughout and consequently the diameter of the rod at the valleys of the screw threads is less than where the screw threads are not formed. This manner of arranging the screw threads usually results in the weakening of the rod at the junction of the threaded portion with the main portion of the rod and breakage at such point is not infrequent. To overcome this defect without corresponding increase in the cost of manufacture, the threaded end 15 is so proportioned to the socket end 5 of the extension 3 that the threaded end 15 may enter the socket 6 until an appropriate proportion of the smooth part of the rod 1 or 2 will enter the counterbore 8 before the rod is firmly screwed into the socket 6. To insure firm connection at this point there is interposed between the threaded end 15 and the threads 7 of the socket 6 a layer of cementing material, indicated at 16. This cementing material may consist of suitable solder or spelter or any material adapted to the purpose, and to bring about the cementing condition it is customary to heat the parts to a sufficient temperature, apply the solder to both parts, and then screw them together while heated, so that all parts of the threads 7 and threaded portion 15 are firmly united by solder and that smooth portion of the sucker rod entering the counterbore 8 is likewise united to the walls of the counterbore by the solder or other cement. In Fig. 3 of the drawings the thickness of the solder layer may be considered as exaggerated for the purpose of clearness of illustration.

When the parts cool the sucker rod and its extension 3 are united. The cementing material will effectually resist any forces tending to unscrew the sucker rod from the socket end of the extension 3 under conditions of use, while the prolongation of the socket member about the smooth full diameter portion of the sucker rod adjacent the threaded end 15 serves to relieve the threaded end of the rod very largely from side strains, wherefore all danger of the breakage of the rod due to its weakening because of the cutting of the exterior threads is wholly eliminated. When it is desirable for purposes of repair or for any other reason to disconnect the extension 3 from the sucker rod it is only necessary to apply heat until the cementing material is softened, when the parts may be readily unscrewed one from the other. The requisite heat for the softening of the solder may be readily obtained by a suitable blow torch or in any other manner desired.

Of course, the soldering or brazing material may be applied about the sucker rod section after it is screwed into the socket member and the brazing material might then be fused and driven into the socket member around the portion of the sucker rod therein by a jet flame, or any other suitable means of uniting the parts may be practised.

Since the extension 3 is not subjected usually to so much wear as the sucker rod, a single extension or pair of extensions may outlast several sucker rods, and consequently the expense of the extensions is correspondingly reduced. The beveled or tapered portions 5ª and 9, and especially the beveled or tapered portion 9 prevents the catching of the sucker rod on the tubing or any other obstruction. Suppose that in lowering a string of rods, say six hundred feed in length, such string of rods should catch on the tubing and be disconnected from the elevator or elevator hook at the surface, the rods might then slip off from the place where they caught and fall down through the tubing possibly two thousand feet, thus damaging the rod and putting the operator to considerable expense to recover the rod, and might even part the tubing. The taper portion 9 should not exceed about forty-five degrees and should feather out on the rod into very close approach thereto.

All the other parts of the coupling are more or less beveled or rounded so as not to present any sharp angles, but the bevel or taper 9 being the leading point of the coupling in either direction of travel must be properly beveled to prevent any possibility of catching and to always properly guide the rod in the tube. The counter-bore 8 is in practice of about three-eighths of an inch in axial length, although not confined to any exact length. Its purpose is to prevent the vibration transmitted over the rods in a working stroke from acting upon the threads of the threaded end 15 to cause crystallization at the junction of the threaded end of the body of the rod with resultant breakage at this point.

What is claimed is:—

1. A sucker rod comprising two sections, each of substantially even diameter throughout with the ends threaded, an extension for each end of the sucker rod provided at one end with a laterally enlarged portion having an axial socket therein threaded to receive the corresponding end of the sucker rod section with the threads related to receive solder when the sucker rod is seated in the socket by sweating the joint so formed, said socket having a counterbore at its entering end to receive the unthreaded portion of the sucker rod adjacent the threaded end, and said extension being of larger diameter than the sucker rod and squared for a portion of its length between its ends with the end remote from the socketed end externally screw threaded, and a straight coupling for the externally threaded ends of the extensions of adjoining sucker rod sections, the socketed end of the extension being separated from the externally threaded end of the extension by the squared portion.

2. A sucker rod comprising two sections, each of substantially even diameter throughout with the ends threaded, an extension for each end of the sucker rod provided at one end with a laterally enlarged portion having an axial socket therein threaded to receive the corresponding end of the sucker rod section with the threads related to receive solder when the sucker rod is seated in the socket by sweating the joint so formed, said socket having a counterbore at its entering end to receive the unthreaded portion of the sucker rod adjacent the threaded end, and said extension being of larger diameter than the sucker rod and squared for a portion of its length between its ends with the end remote from the socketed end externally screw threaded, and a straight coupling for the externally threaded ends of the extensions of adjoining sucker rod sections, the socketed end of the extension being separated from the externally threaded end of the extension by the squared portion, and the externally threaded portion of each extension being of greater length than sufficient to enter the coupling and there provided with a nut of harder material than the rest of the structure and constituting a wear member for protecting the external surface of the coupling.

In testimony, that I claim the foregoing as my own, I have hereto affixed my signature in the presence of two witnesses.

CLARENCE LYMAN PARKER.

Witnesses:
  MABEL BRITTON EUSTIS,
  L. S. EUSTIS.